July 7, 1970 G. R. WHITE, JR 3,519,982
METHOD AND MEANS OF FORMING ELECTRICAL
CONNECTIONS WITH CONDUCTORS
Filed Nov. 6, 1968 3 Sheets-Sheet 1

INVENTOR
GEROME R. WHITE Jr
BY Kenyon & Kenyon
ATTORNEYS

INVENTOR
GEROME R. WHITE Jr
BY Kenyon & Kenyon
ATTORNEYS

INVENTOR
GEROME R. WHITE Jr
BY Kenyon & Kenyon
ATTORNEYS

United States Patent Office 3,519,982

Patented July 7, 1970

3,519,982

METHOD AND MEANS OF FORMING ELECTRICAL CONNECTIONS WITH CONDUCTORS

Gerome R. White, Jr., 19 Old Stable Road, Demarest, N.J. 07627

Continuation-in-part of application Ser. No. 697,226, Jan. 11, 1968. This application Nov. 6, 1968, Ser. No. 773,719

Int. Cl. H01r *5/04*

U.S. Cl. 339—275 60 Claims

ABSTRACT OF THE DISCLOSURE

Electrical connectors for conductors and methods of forming the same in which the connectors are precoated with flux and solder and so formed that they may simultaneously be conformed to and soldered with a conductor to form a junction of high reliability. Variations of particular usefulness in back plane wiring are also disclosed.

RELATED APPLICATIONS

This application is a continuation-in-part of application Ser. No. 697,226, filed Jan. 11, 1968, by Gerome R. White, Jr., for Electrical Terminal.

BACKGROUND OF THE INVENTION

My invention has to do with the attachment of electrical connectors to the end of small conductors in a rapid, inexpensive and highly reliable manner from the standpoint of both mechanical and electrical long life stability. By small conductors, I mean wires in the range from about 1/0 gauge down to about 40 gauge, in other words, conductors having a diameter from about .351 inch to about .00314 inch. This is the size range of conductors used on a truly mass basis in common soldering and crimping techniques in many common electrical devices, such as radio and television sets and computers, where the power dissipated as heat in the connective junction between conductor and connector during the normal functioning of the device for its intended purpose is small. This size range excludes larger conductors used in high power electrical devices, such as large electric motors for heavy machinery, where soldering is not practical because of the power dissipated as heat in the connective junction between conductor and connector is very large.

In past commercial practice for conductors of the small size range mentioned, connectors have been either crimped or soldered to the conductors. While crimping is attractive because it is fast and inexpensive, it has the serious disadvantage that a mechanically and electrically undesirable connection results because of the limited area of contact between the conductor and connector, or because of mechanical loosening with time and environmental conditions such as oxidation, corrosion, etc. While soldering tends to be somewhat more reliable from the standpoint of durability, and both electrical and mechanical effectiveness, even soldering as usually practiced leaves much to be desired since its reliability depends upon the skill of the operator in manipulating the process.

Since both the art of the filler metals comprising the actual solder, and the art of fluxes which constitute catalytic cleaning and wetting agents, are sophisticated technologies both as to the properties of the solder and the chemistry of the flux, considerable operator skill is required if long life reliable connections are to be obtained. Modern solder technology has provided detailed disclosures on the soldering phenomenon which can only be advantageously applied to connective processes by astute control of the quantity, dispersion, thickness and penetration profile. The operator may, therefore, for example, make an electrically and mechanically unreliable connection between the conductor and connector by improper heating, or by using too little or too much solder, too little or too much flux, or by leaving flux gaps, or by failure to keep the conductor and connector and solder in fixed position while the solder is cooling. The consequences may be porous or loose connections between the conductor and the connector which result in poor electrical behavior, such as varying resistance or in weak mechanical bonds which ultimately break. Moreover, where there is a tenuous thermal bond between the conductor and connector, temperature variations during the useful life of the wire-connector junction may result in degradation of mechanical and electrical stability. In any event, soldering, as usually practiced, is clumsy and time consuming. It is highly desirable therefore to have a technique which minimizes the skill required of the operator in the actual soldering process, i.e., a technique in which the technological difficulties can be met during prefabrication of connectors before the operator uses them in the actual soldering process.

Apart from errors of the operator, both the crimping technique and the soldering technique of past commercial practice have inherently required excessive amounts of metal, such as copper in the connector itself, and excessive amounts of solder because of the separate application of either the crimping or the soldering technique.

A further problem of concern in past soldering practices in the small size range mentioned is that of wicking. This is the tendency of excess fluid solder to flow along the conductor by capillary action and thermal driving forces to portions of the conductor where is is not needed and performs no useful function. This tends to create a brittle point along the conductor where the wicking ends. The result is that frequently during the useful life of the junction the brittleness causes the conductor to break and thus disconnect itself completely or partially from the connector. It is thus highly desirable to have a technique in the small size range mentioned which eliminates excessive solder and consequently eliminates excessive wicking.

While Fergusion U.S. Pat. No. 2,250,156 has incidentally suggested the use of a precoated layer of relatively low melting-point metal on a terminal, the teaching of this patent is primarily directed to a welding technique for larger terminal connections capable of handling high electrical power requirements where much power is dissipated as heat in the connective junction. It has not addressed itself to the problems which exist in the environment of small conductor to connector junctions of low dissipative power requirement in the connective juction to which my invention is addressed.

SUMMARY OF THE INVENTION

The object of my invention is to provide a superior technique which will produce mechanically and electrically more reliable long life connections between conductors and connectors rapidly, more economically, and with minimum requirement of operator skill, in the range of small conductors previously mentioned, namely about 1/0 gauge down to about 40 gauge, which is the range of common mass production soldering and crimping techniques needed for common electrical devices such as radio, televsion and computer equipment. In general this object is attained by simultaneously soldering and conforming the connector with the conductor using a connector structure provided with a laminated or cored fluxed solder layer between a conformable connector portion and the conductor. The thickness of both the conformable connector portion and the fluxed solder layer are minimized in such a way that less metal and less solder are required than in past practices referred to above. This results in not only considerable economy of materials, metal and solder, but also in a much superior interconnection between the connector and the conductor because the solder, while in the fluid condition, is held in fixed relationship to the conductor and connector long enough to permit it to cool and solidify without motion, and because of the creation of an alloyed monolithic continuum junction between the connector and the conductor. Moreover, there is virtually no excessive solder in and around the connection.

Variations of the invention, particularly useful in back plane wiring, permit more rapid and more compact techniques for back plane wiring which are far superior to present techniques for back plane wiring.

DESCRIPTION OF THE DRAWINGS

FIG. 1 shows a connector in accordance with my invention prior to connection to the conductor shown, while

DESCRIPTION OF THE PREFERRED EMBODIMENT

Figure 1:
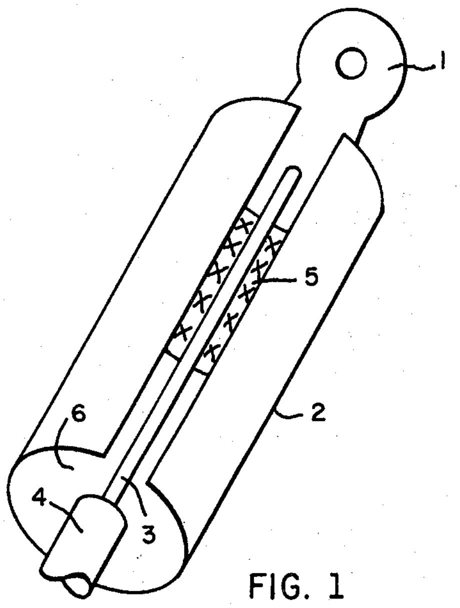
Figure 2:
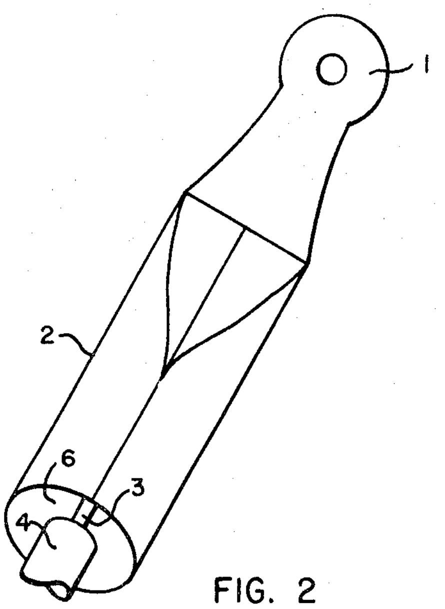
FIGS. 2 and 3 show its connection to the conductor after performance of the method of my invention.
Figure 3:
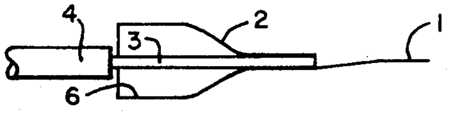

FIGS. 1–3 illustrate one form of my connector technique together with the manner of its use. Its special characteristics will be described below. The connector illustrated comprises an annular metallic terminal or lug portion 1 for attachment to a suitable terminal (not shown) in any suitable piece of electrical equipment in the low dissipative power range previously mentioned (e.g., radio, television, computers), and a metallic conformable surround portion 2 of cylindrical or similar shape which may be positioned to totally surround the bare end 3 of an insulated conductor 4 and thereafter be conformed thereto by pressure and/or heat and heated sufficiently to flow the fluxed solder.

Figure 4:
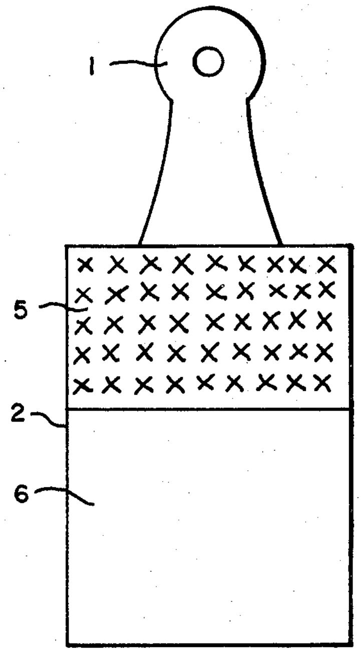
FIG. 4 illustrates a blank form from which the connector of FIGS. 1–3 is formed in accordance with the method of my invention.

The inner surface of conformable surround portion 2, particularly the illustrated area adjacent the terminal portion 1, is surfaced with a layer of fluxed solder 5 having flux laminated or cored therein. This layer is formed in accordance with instructions below so that an alloyed monolithic continuum junction is formed between the bare end 3 of conductor 4 and the surround portion 2 when the connector is used. The connector may be manufactured by stamping flat metal blanks as shown in FIG. 4 from a large flat metal sheet after applying the layer of fluxed solder 5, and then rolling conformable portion 2 into the shape shown in FIG. 1 which will be seen to surround the bare end 3 substantially completely, at least when ultimately conformed with the bare end 3.

In the assembly of the connector to a conductor 4, bare end 3 of the conductor 4 is first inserted into the conformable portion 2 far enough to be completely engaged by the fluxed solder 5 when the surround portion 2 is pressure conformed with the end 3. Then the conformable portion 2 is collapsed by pressure and/or heat to conform with the bare end 3 in firm engagement therewith and simultaneously heated sufficiently to flow the solder sufficiently to cause ultimate engagement of the solder with both the conformable portion 2 and the conductor. Any suitable means to this end may be used.

The thickness of the fluxed solder layer 5 and its length along the surround portion 2 are predetermined so that there is substantially no wicking and the solder is virtually confined to the area of its original placement on the surround portion 2. Connectors of the type shown in FIGS. 1–3 are quite small for the small size wires previously indicated, e.g., less than an inch in length overall. The soldered portion should have a long enough length to insure that there is little opportunity for the fluid solder to flow lengthwise.

It is to be noted that the end 6 comprising about one-half the length of conformable portion 2 is preferably left free of solder. This is done because, in accordance with one inventive feature, this unsoldered portion is to be left unconformed and unsoldered to the conductor in the connecting operation. This feature tends to protect further against the effects of wicking which, as indicated, tends to cause the wire to break because of brittleness. The unsoldered portion 6 will form a collar spaced from the conductor on one side of the soldered junction, which collar will tend to minimize bending which might cause breakage of the conductor at the brittle point where the solder ends and bare conductor continues.

The end 6 may, in accordance with another inventive feature, be surfaced with a thermally affected plastic or adhesive material thick enough to bond with or otherwise firmly hold the insulation of conductor 4 when that insulation is permitted to extend into the end 6. This will further minimize bending which might cause breakage by securing conductor 4 in fixed position within end 6. The thermally affected plastic may be such as will be activated by the heat of the soldering operation sufficiently to bond with the insulation of conductor 4.

Figure 5:
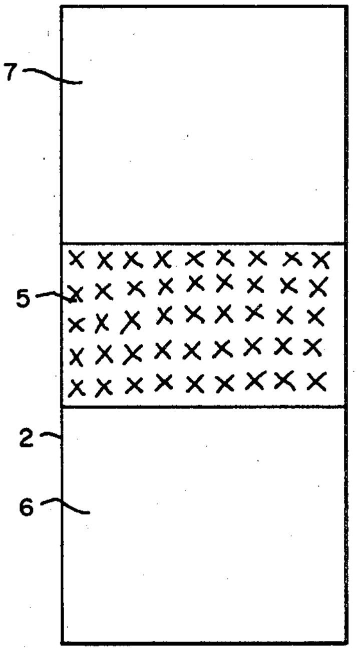
FIGS. 5 and 6 illustrate an alternative technique for forming the connector of my invention.
Figure 6:
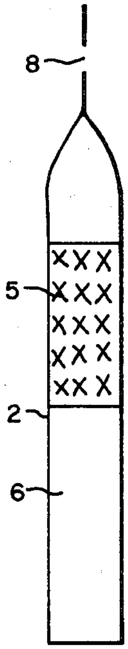

In FIGS. 5 and 6, there is illustrated an alternative method of forming the connector. In contrast with FIG. 4, the flat blank sheet of FIG. 5 is in simple rectangular form including the central solder portion 5 and the portion 6 as in FIG. 4 but, in addition, an extended rectangular section 7 which will be used to form a terminal similar to the terminal 1.

In this case, the rectangular form of FIG. 5 is simply rolled into a cylinder as illustrated in FIG. 6 and the end thereof formed by section 7 is crushed so that a flat terminal portion 8 is formed through which a terminal hole may be cut to form a terminal corresponding to the terminal hole 1 in the FIGS. 1–4. The merit of this construction is that the terminal end portion 8 is therefore stronger because of the double thickness caused by the crushing of the cylindrical form. This is of particular usefulness when one takes into account the fact that the thickness of the sheet material of surround portion 2 is thinner than the sheet materials used in prior area constructions and therefore may not be quite strong enough for the terminal end of the connector.

The terminal portions 1 of FIGS. 1 through 6 may be the male or female portions of a male-female connector configuration.

The advantages of the simultaneous conforming and soldering techniques outlined above and further specified below are numerous. Thus, because the conformable surround portion 2 holds the fluid solder in a fixed mold around the conductor while the solder cools, there is no relative movement between the solder and either the conductor or the surround portion 2 while the solder is in the fluid state. This assures that the solder will solidify into a firm alloyed monolithic continuum junction with the conductor and surround portion 2 without porosity or cracks which might develop because of relative movement, as by movement of the hand of the operator in removing the heat source. Moreover, because the strength of the connection derives mainly from the alloyed monolithic continuum junction formed by the solder and metal, the conformable portion 2 may be made of thinner metal than that used in past practice. Further, the amount of solder and flux can be closely controlled during fabrication of the connector in the factory so that there is virtually neither an excess nor an insufficiency of fluxed solder, thus eliminating any danger that the operator, during the soldering operation, can err in this respect. Since solder and flux are applied during fabrication, accuracy and standardization of relationship can be closely controlled, due to elimination of operator judgment—true quality and process control is thus achieved. This means, moreover, not only that there is no waste of solder nor lack of it, but, most importantly, that the amount of solder may be precisely controlled to bring about an alloyed monolithic continuum junction which is an important feature of the invention. It means, moreover, that the operator is positively prevented from producing the tenuous bond between the conductor and the connector previously referred to which might, during the long lifetime of the connector, result in degradation of mechanical and electrical reliability because of temperature variations.

By alloyed monolithic continuum junction is meant a junction formed solely of a region in which the solder and the conductor and the conformable portion 2 are all intimately bound together in an alloyed state with no intervening layers or pockets comprised of solder alone. Such layers or pockets would impair the reliability of the junction, as by decreasing mechanical strength. The nature of the alloyed state between the solder and metal has been described in various places in the art (see, for example, page 113 of Howard H. Manko, Solders and Soldering, McGraw-Hill Book Company, New York, 1964).

Thus, it is known that fluid solder will penetrate metal to a certain depth and form a layer in which solder and metal are in an alloyed state. Thus, the aim of the invention is to have such a layer on conductor 3 be contiguous with such layer on conformable portion 2, with no intervening layers of pockets of solder alone.

Figure 7:
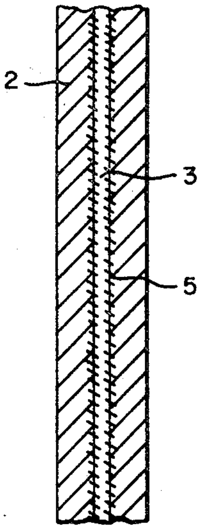
FIG. 7 illustrates the alloyed monolithic continuum junction of my invention.

This state of affairs is illustrated by FIG. 7 which indicates (after conforming and soldering) the conductor end 3, the metal of the conformable portion 2, and, in shading, the layer in which they are joined in alloyed monolithic continuum junction in a kind of thin film interface region. It is understood that this region would extend completely around the conductor end 3 and the inner surface of the conformable portion 2. Since solder typically migrates into copper under proper conditions of thermal driving forces, an alloyed monolithic continuum state between the copper and the solder to a controlled depth of typically .0007 inch may be achieved in a straightforward manner. It will be understood that the radial depth of this annular region depicted in FIG. 7 will be typically .0015 inch taking into account the penetration into both the conductor and the conformable portion 2.

Thus, the bonding process of my invention is one which forms a truly intimate metallurgical bond between the directly abutting surfaces of the metal members (connector and conductor) as though the members were one integral mass. The binder is a thin film alloy layer extending on both side of the abutment formed by the wetting and diffusion into the surfaces of the solder which forms the alloy. The resulting bond is an example of solution hardening, that is, small amounts of an alloying substance are added to the metallic lattice. This causes internal stresses similar to those in work hardening. Neither annealing or other treatment will affect the increased strength of the alloyed monolithic continuum junction.

To the foregoing ends, the conformable portion 2 should be made so that it is non-elastic and therefore does not elastically withdraw away from the wire 3 after having been conformed to the wire by whatever pressure tool is used. The conformable portion 2 may therefore be made of thin copper, or other suitable metal which, when sufficiently heated, becomes slightly plastic, thereby allowing a structural collapse requiring less conforming pressure than prior art techniques, and without structural damage. Heated copper conforms easily with conductor end 3 due to its plastic state, or, rather, they conform readily to each other when heated. Moreover, the fluxed solder layer 5 should be just thick enough, no more, no less, to assure the ultimate existence of an alloyed monolithic continuum junction between conductor end 3 and conformable portion 2 when the conformable portion 2 and its solder layer 5 are simultaneously conformed with conductor end 3 and heated to flow the solder layer 5. If the longitudinal length of the connector portion surfaced with solder is long enough and the solder layer thin enough, then the fluid solder will be held firmly between the conductor end 3 and the conformable portion 2 without any significant flow out of the ends of the portion surfaced with solder. This will not only assure rigidity of the solder while in the fluid state, but also will minimize wicking.

As previously indicated, my technique offers the possibility of making the conformable portion 2 of much thinner metal than required in prior art techniques. In this connection, it is important to understand that while the thinner metal of my technique may not offer much mechanical strength for the connection by itself, and similarly, that while fluxed solder and the conductor may not offer much mechanical strength for the connection by themselves, nevertheless, when they are joined properly in alloyed monolithic continuum junction there will be mechanical strength for the connection between them because of the interface film of alloyed monolithic continuum. Moreover, there is improved electrical conductivity as well as improved heat conductivity desired for the dissipation of power losses in the junction if that is necessary. Any shortcomings of mechanical strength in the portions extending to the terminal portion 1 may be made up by having a more extended cylindrical surface between conformable portion 2 and terminal 1, or by the technique of FIG. 6.

In practice, as indicated, the penetration of solder migration should typically be about .0007 inch for the case of copper. Other metals may require a somewhat different depth or thickness to obtain the same results. In the case of stranded conductors, somewhat more solder may be required to fill the interstices or gaps which normally occur between the strands of a stranded conductor, but otherwise, the outer surface of the stranded conductor will be joined to the conformable portion 2 in alloyed monolithic continuum junction.

It will be understood that the thickness of solder flux layer 5 is not the same as the depth of penetration of the solder into the metal since the latter is determined rather by the interaction of the cleaned metal and the fluid solder when heated. The thickness of solder flux layer 5 can be predetermined to produce the desired penetration and typical thicknesses are indicated below.

As a practical illustration of the results which may be obtained by the foregoing techniques, the following chart lists dimensions which I have found to be workable in practical connectors. The chart is more or less self-explanatory and shows the typical copper thickness for the conformable portion 2 required for various gauges of stranded copper conductor and also the typical thickness of the solder coating which will produce the required depth of penetration and filling of the interstices of the stranded conductor, all dimensions being expressed in inches. In the far right column is shown typical prior art copper thicknesses for connectors similar to those here involved, but not using my invention, and it will be noted that they are considerably greater than those shown for my invention.

| Conductor gauge copper (stranded) | Conductor diameter (in.) | Typical copper thickness (in.) | Typical thickness solder surface | Prior art copper Thickness (in.) |
|---|---|---|---|---|
| 1/0 | .351 | .060 | .0068 | .13 |
| 1 | .275 | .050 | .0064 | .12 |
| 2 | .258 | .040 | .0059 | .10 |
| 3 | .229 | .033 | .0055 | .07 |
| 4 | .204 | .031 | .0051 | .07 |
| 5 | .182 | .029 | .0048 | .06 |
| 6 | .162 | .027 | .0045 | .05 |
| 7 | .144 | .025 | .0041 | .04 |
| 8 | .129 | .024 | .0039 | .04 |
| 9 | .114 | .022 | .0036 | .04 |
| 10 | .102 | .020 | .0033 | .04 |
| 12 | .081 | .012 | .0031 | .04 |
| 14 | .064 | .011 | .0029 | .03 |
| 16 | .051 | .010 | .0027 | .03 |
| 18 | .040 | .009 | .0025 | .03 |
| 22 | .025 | .009 | .0023 | .03 |
| 24 | .020 | .006 | .0021 | .02 |
| 26 | .019 | .006 | .0020 | .02 |
| 28 | .015 | .005 | .0018 | |
| 30 | .012 | .004 | .0017 | |
| 32 | .0093 | .004 | .0016 | |
| 34 | | .004 | .0014 | |
| 36 | | .004 | .0013 | |
| 38 | | .004 | .0012 | |
| 40 | | | | |
| 42 | | | | |

As previously indicated, connectors of the type discussed above are normally in the size of not greater than one inch in length. The solder coated portion might be of the order of half that length. This should be sufficient to prevent longitudinal flow of the solder and wicking as previously described.

My technique described above offers the capability of providing the operator of the soldering process with a precise amount of fluxed solder as the requirements of the process may dictate. Compared to prior art techniques, the possibility of operator error is therefore virtually eliminated. This characteristic is fully controllable and predictable in the connector fabrication stage. All of the physical and chemical requirements of the process are met in the fabrication stage rather than at the process stage of actual soldering.

BACK PLANE WIRING

Back plane wiring means simply the techniques for attaching conductors to a complex of terminal posts on one side of a supporting surface, the terminal posts extending through the surface for attachment to various electrical components supported on the other side of the surface. For example, the surface may be the chassis of a radio or television set, or the printed circuit board of a computer or telephone installation. The components may be various tubes, transistors, capacitors, resistors or solid state devices now in common use. Any number of electrical components may be mounted on one side of the surface and many complex conductor connections to numerous terminal posts on the other side may be required.

The problem of making the complex conductor connections to such terminal posts is a severe one. The art is continually demanding ever higher standards of electrical and mechanical reliability for such connections as well as shorter time requirements for effecting them. One of the more common techniques now in use for this purpose is a technique in which the conductor is wound around the terminal. This requires considerable spacing between the terminals to leave room for the winding tool. All in all, the technique is a relatively intricate one and it is time consuming. My invention offers considerable opportunities for improvement both as to reliability and reduced time and spacing requirements, particularly in the increased number of conductors which can be accommodated in a given space (increased conductor density).

Figure 8:
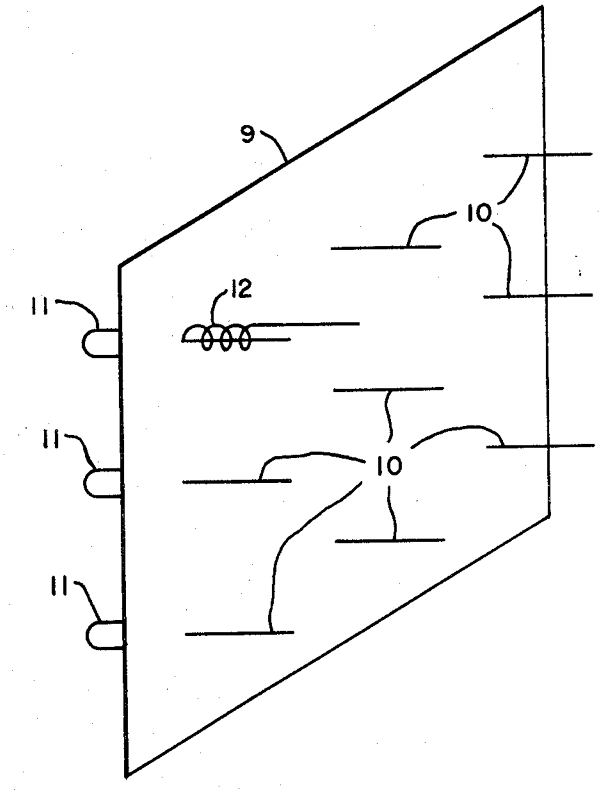
FIG. 8 illustrates a typical back plane wiring installation using a common prior art technique.

FIG. 8 illustrates a typical back plane wiring installation on a board 9 having terminal posts 10 protruding therethrough on the right hand side thereof and suitable electrical components 11 on the left side connected to the terminal posts. One typical prior art connection is illustrated at 12 and it will be seen that the conductor is simply coiled around one terminal post 10. The terminal posts may, for example, be copper rods about an inch long and of square cross-section about a sixteenth of an inch on a side. It is normally required that a specified number of the outer turns of the conductor wound around the terminal posts be left free of the terminal post so that the connection is resilient. This requirement adds to the complexity and difficulties of the technique.

By contrast with the foregoing wound conductor technique, the following techniques made possible by my invention offer the possibility of a greatly increased conductor density at a single terminal post, as well as a much greater ease and speed with which the numerous connections can be made in a highly reliable manner. Moreover, my technique has the important merit that presently existing production equipment developed for the wound conductor technique at a great cost need not be scrapped because it may easily be adapted to the practice of my technique.

Figure 9:
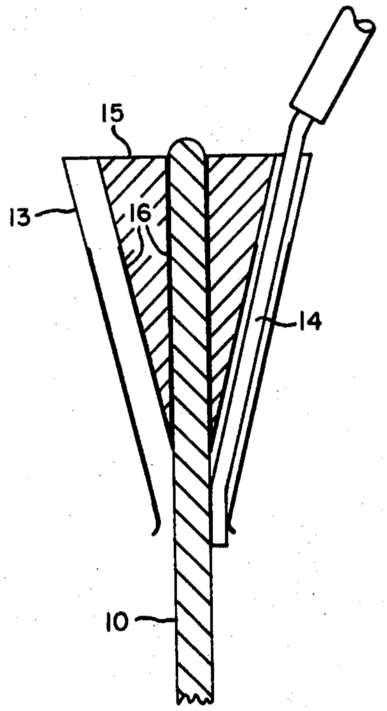
FIGS. 9 and 10 illustrate a connection technique for a back plane wiring installation using my invention, FIG. 10 being a cross-section through the conical configuration of FIG. 9.
Figure 10:
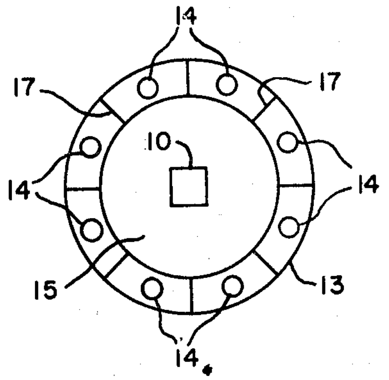

FIGS. 9 and 10 illustrate one way in which my concepts may be used to substitute for the wound conductor technique in a greatly improved manner.

In FIGS. 9 and 10, the standard terminal post of the FIG. 8 is illustrated, together with what may be termed a "tulip" construction in accordance with my invention. Here there is slipped over the terminal post 10 a conically shaped metal (e.g., copper) surround member 13 surfaced on its inner surface with fluxed solder to a depth in accordance with the concepts previously described, namely to a depth to produce an alloyed monolithic continuum junction. After the bared conductor end 14 is inserted into the tulip as shown, then the conically shaped metal (e.g., copper) member 15 is slipped over the terminal 10 and pressed against the wire end 14. Member 15 is similarly surfaced with fluxed solder laminate 16 in accordance with the concepts previously outlined, i.e., to a depth to produce the alloyed monolithic continuum junction effects previously outlined. Thereafter, the conductor and the surround member 13 may be conformed by pressure and heated to form a solid firm alloyed monolithic continuum junction between member 15, the terminal post 10, the surround 13 and the conductor 14 by any sort of tool for simultaneously conforming and heating as previously outlined. Member 15 may simultaneously be soldered to terminal 10.

In FIG. 10, which shows a cross-section of FIG. 9, it is indicated that as many as eight conductor ends may be joined to the terminal post 10 at the same time by placing them at various radial points around the terminal post 10, although the number of conductor ends is illustrative only and may be lesser or greater, depending on the dimensions involved. As indicated by FIG. 10, the annular space between members 13 and 14 may be divided into compartments by radially extending walls 17 also of conformable metal coated with solder, if desired, and which form compartments for easy placement of the conductors 14.

The shape of conformable surround 13 may be other than conical, cylindrical, for example, and its thickness, as well as the thickness of the solder flux surfacings may be predetermined in accordance with the requirements discussed in connection with FIGS. 1 to 7. It may not be necessary to use a member 15. Moreover, the members 13 and 15 may be integrally attached to terminal posts 10 prior to the soldering operation, as when the terminal posts 10 are being fabricated.

A multiplicity of tulips, as in FIGS. 8 and 9 may be placed on a single terminal post 10 along the length thereof, thus multiplying the conductor density applicable to a single terminal post.

Figure 11:
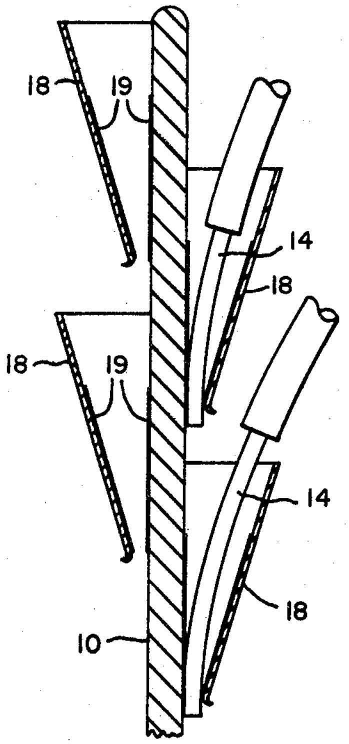
FIGS. 11 and 12 illustrate another technique for back plane wiring in accordance with my invention.
Figure 12:
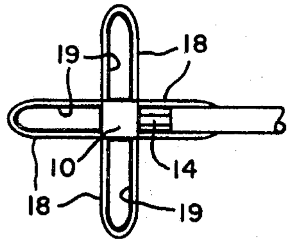

FIGS. 11 and 12 illustrate another technique for back plane wiring in accordance with my invention, FIG. 11 being a vertical cross-section, and FIG. 12 being a view looking downward from the top of FIG. 11. In these figures, a plurality of semi-conical conformable metal members 18 are affixed to the flat sides of terminal post 10 in staggered spacing along its length analogously to a gladiola flower. Therefore it is called a "glad" construction. Members 18 are surfaced on their inner surfaces with a layer of fluxed solder 19 which also extends over the corresponding surface of terminal post 10, as shown. The thickness of members 18 and solder layers 19 may be in accordance with the teachings of FIGS. 1 to 7, i.e., such that when conformable members 18 and the fluxed solder layers are conformed by pressure and/or heat, and heated to flow the solder, with conductor ends 14 within members 18 as shown, an alloyed continuum monolithic junction between conductors 14, members 18 and terminal post 10 is formed. Moreover, members 18 may be integrally attached to the terminal posts 10 prior to the soldering operation, as when the terminal posts 10 are being fabricated.

Figure 13:
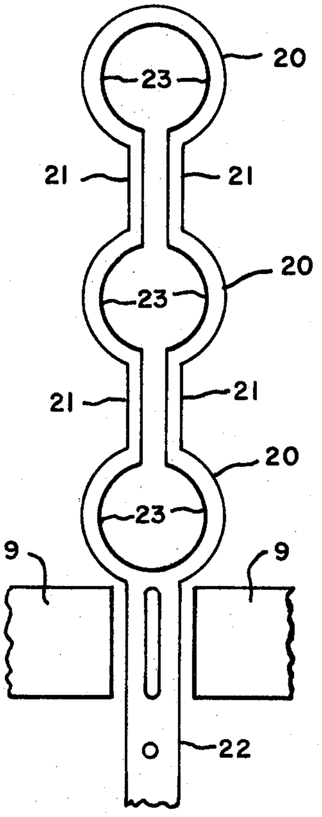
FIGS. 13 and 14 illustrate still another technique for back plane wiring in accordance with my invention.
Figure 14:
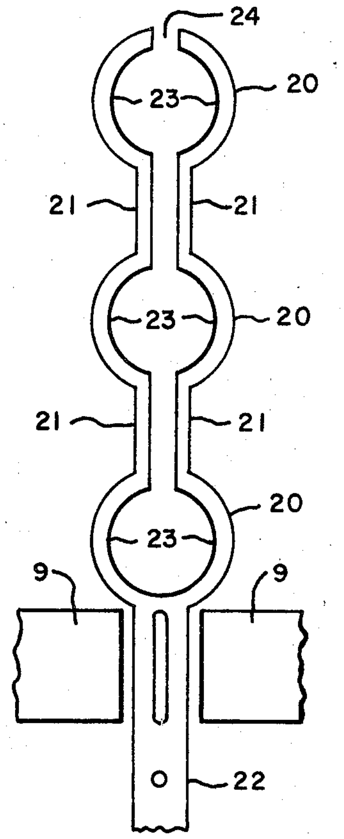

FIGS. 13 and 14 illustrate still another technique for back plane wiring in accordance with my invention. FIG. 13 is a cross-section through a structure comprising three open ended cylindrical portions 20 interjoined by connecting portions 21 and connected to a terminal post portion 22, which may extend through surface 9 (a printed circuit board, for example) as a terminal post similar to terminal post 10 of the previous figures. Portions 20, 21 and 22 may be integrally formed of metal, such as copper. Portions 20 are surfaced with fluxed solder layers 23. The thickness of portions 20 and of fluxed solder layers 23 may be in accordance with the teachings of FIGS. 1 to 7, i.e., such that when portions 20 with fluxed solder layers 23 are conformed by pressure and/or heat to a conductor within their cylindrical configuration and heated to flow the solder, an alloyed monolithic continuum junction between the conductor and portions 20 results.

FIG. 14 is the same as FIG. 13, except that an opening 24 is provided along the length of the upper cylindrical portion 20 to provide a spring action.

It will be understood that by "surround" or "conformable surround" in the claims, I means a member as previously illustrated which when conformed by pressure and/or heat with a conductor, will enclose substantially completely the fluid solder formed from the solder surfacing so that the fluid solder is held rigidly between the conductor and surround while it forms the alloyed monolithic continuum junction and solidifies, and virtually none of the fluid solder escapes in the longitudinal direction of the conductor to wick along the conductor.

What is claimed is:

1. The method of forming an electrical connector for a conductor in the size range of about 1/0 gauge to about 40 gauge to be joined to the connector in a highly stable electrical and mechanical relationship comprising:

selecting a sheet of conductive material having properties such that a portion of said sheet surrounding said conductor may be crimped around said conductor by pressure and/or heat with fluxed solder therebetween in such manner that the solder when in fluid condition is held in fixed position around said conductor by said portion;

surfacing a selected portion of said sheet with fluxed solder to an extent predetermined to form a firm junction between said conductor and said sheet relatively free of solder unalloyed with said conductor or said sheet portion without wicking along the length of the conductor when said sheet is conformed with said crimped around said fluxed solder in between and heat is applied to flow the solder long enough to form a firm electrical and mechanical junction between the conductor and said portion; and thereafter forming from said selected portion and its solder surfacing a surround for said conductor which may be crimped around said conductor and heated to form an electrically stable junction between said conductor and the conductive material of the surround.

2. The method as in claim 1 in which the amount of fluxed solder surfacing is predetermined to cause a penetration of the flowed solder into the conductor and surround to a depth of typically .0007 inch.

3. The method as in claim 1 in which the conductor is stranded and the fluxed solder surfacing has a thickness in the typical range .0068 inch to .0012 inch.

4. The method as in claim 1 in which said sheet of conductive material is copper of thickness in the typical range .060 to .004 inch and the fluxed solder surfacing has a thickness in the typical range .0068 to .0012 inch.

5. The method as in claim 1 including forming a terminal lug contiguous with the surround.

6. The method as in claim 1 including forming contiguous with said surround a collar portion spaced from said conductor to protect against excessive brittleness at the point where wicking ceases.

7. The method as in claim 6 including surfacing the inner surface of the collar with a material for holding the insulation of the conductor.

8. The method of forming an electrical connector for a conductor in the size range of about 1/0 gauge to about 40 gauge to be joined to the connector in alloyed monolithic continuum junction to the connector comprising:

selecting a sheet of conductive material of properties such that a portion of said sheet surrounding said conductor may be crimped around said conductor by pressure and/or heat with fluxed solder therebetween in such manner that the solder when in fluid condition is held in fixed position by that portion;

surfacing a selected portion of said sheet with fluxed solder of thickness predetermined to form an alloyed monolithic continuum junction between said conductor and said sheet when said sheet is crimped around said conductor and heat is applied to flow the solder; and thereafter forming from said selected portion and its fluxed solder surfacing a surround for said conductor which may be crimped around said conductor and heated to form an alloyed monolithic continuum junction between said conductor and the conductive material of the surround.

9. The method as in claim 8 in which the amount of fluxed solder surfacing is predetermined to cause a penetration of the flowed solder into the conductor and surround to a depth of typically .0007 inch.

10. The method as in claim 8 in which the conductor is stranded and the fluxed solder surfacing has a thickness in the typical range .0068 inch to .0012 inch.

11. The method as in claim 8 in which said sheet of conductive material is copper of thickness in the typical range .060 to .004 inch and the fluxed solder surfacing has a thickness in the typical range .0068 to .0012 inch.

12. The method as in claim 8 including forming a terminal lug contiguous with said surround.

13. The method as in claim 8 including forming a contiguous with said surround a collar portion spaced from said conductor to protect against excessive brittleness at the point where wicking occurs.

14. The method as in claim 13 including surfacing the inner surface of the collar with a material for holding the insulation of the conductor.

15. An electrical connector for a conductor in the size range of about 1/0 gauge to about 40 gauge to be joined to the connector in highly stable electrical and mechanical relationship comprising:

a surround for said conductor consisting of: a layer of conductive material having properties such that said layer may be crimped by pressure and/or heat around said conductor with fluxed solder therebetween in such manner that the solder when in fluid condition is held in fixed position by that layer; and a layer of fluxed solder, within said layer of conductive material, having a thickness predetermined to form a firm junction between said conductor and said sheet relatively free of solder unalloyed with said conductor or said layer of conductive material without wicking along the length of the conductor when said layer of conductive material is crimped around said conductor with said fluxed solder in between and heat is applied to flow the solder long enough to form a firm electrical and mechanical junction between the conductor and said layer of conductive material.

16 A connector as in claim 15 in which the amount of fluxed solder is predetermined to cause a penetration of the flowed solder into the conductor and surround to a depth of typically .0007 inch.

17. A connector as in claim 15 in which the conductor is stranded and the fluxed solder has a thickness in the typical range .0068 inch to .0012 inch.

18. A connector as in claim 15 in which said layer of conductive material is of copper of thickness in the typical range .060 to .004 inch and the fluxed solder has a thickness in the typical range .0068 to .0012 inch.

19. A connector as in claim 15 having a terminal lug contiguous with said surround.

20. A connector as in claim 15 having a collar portion contiguous with said surround spaced from said conductor to protect against excessive brittleness at the point where wicking occurs.

21. A connector as in claim 20 in which the inner surface of the collar is surfaced with a material for holding the insulation of the conductor.

22. An electrical connector for a conductor in the size range of about 1/0 gauge to about 40 gauge to be joined to the connector in alloyed monolithic continuum junction with the connector comprising:

a surround for said conductor consisting of:

- a layer of conductive material of properties such that said layer may be crimped by pressure and/or heat around said conductor with fluxed solder therebetween in such manner that the solder when in fluid condition is held in a fixed position by that layer; and
- a layer of fluxed solder, within said layer of conductive material, having a thickness predetermined to form an alloyed monolithic continuum junction between said conductor and said layer of conductive material when said layer of conductive material is crimped around said conductor with said fluxed solder in between and heat is applied to flow the solder long enough to form an alloyed monolithic continuum junction between the conductor and said layer of conductive material.

23. A connector as in claim 22 in which the amount of solder is predetermined to cause a penetration of the flowed solder into the conductor and surrounded to a depth of typically .0007 inch.

24. A connector as in claim 22 in which the conductor is stranded and the fluxed solder has a thickness in the typical range .0068 inch to .0012 inch.

25. A connector as in claim 22 in which said layer of conductive material is of copper of thickness in the typical mate range .060 to .004 inch and the solder has a thickness in the typical range .0068 to .0012 inch.

26. A connector as in claim 22 having a terminal lug contiguous with said surround.

27. A connector as in claim 22 having a collar portion contiguous with said surround spaced from said conductor to protect against excessive brittleness at the point where wicking occurs.

28. A connector as in claim 27 in which the inner surface of the collar is surfaced with a material for holding the insulation of the conductor.

29. The method of connecting a conductor to a terminal post comprising:

inserting the conductor to be connected to the terminal post within a crimpable surround surrounding the terminal post and internally surfaced with fluxed solder; and thereafter crimping the surround around the conductor and the terminal post and heating to form a soldered junction between the surround, the conductor and the terminal post.

30. The method as in claim 29 in which the amount of fluxed solder is predetermined to form an alloyed monolithic continuum junction between the conductor, the surround and the terminal post.

31. The method as in claim 29 in which the amount of fluxed solder is predetermined to cause a penetration of the flowed solder into the conductor, the surround and the terminal post to the depth of typically .0007 inch.

32. The method as in claim 29 in which the fluxed solder surfacing has a thickness in the typical range .0068 inch to .0012 inch.

33. The method as in claim 29 in which the crimpable surround is of copper of thickness in the approximate range .060 to .004 inch and the fluxed solder surfacing has a thickness in the typical range .0068 inch to .0012 inch.

34. An electrical connection comprising:

a terminal post;

a crimpable surround surrounding the terminal post and surfaced internally with fluxed solder;

a conductor between the surround and the terminal post;

the surround, conductor, terminal post, and solder being crimped together in alloyed monolithic continuum junction.

35. An electrical connection as in claim 34 in which the amount of fluxed solder is predetermined to cause a penetration of the solder into the conductor, surround and terminal post to a depth of typically .0007 inch.

36. An electrical connection as in claim 34 in which the crimpable surround is of copper of thickness in the typical range .060 to .004 inches.

37. In combination in a back plane wiring configuration:

a plurality of terminal posts protruding from a supporting surface;

at least one crimpable surround surrounding at least a portion of one terminal post and internally surfaced with fluxed solder, the surround receiving at least one conductor between the surround and the post for connection to the post by crimping of the surround around the conductor against the post under pressure and heat.

38. The combination as in claim 37 in which the amount of fluxed solder is predetermined to form an alloyed monolithic continuum junction between the conductor, the surround and terminal post.

39. The combination as in claim 37 in which the amount of fluxed solder is predetermined to cause a penetration of the solder into the conductor, surround and terminal post to a depth of typically .0007 inch.

40. The combination as in claim 37 in which the conductor is stranded and the fluxed solder has a thickness in the typical range .0068 inch to .0012 inch.

41. The combination as in claim 37 in which the crimpable surround is of copper of thickness in the typical range .060 to .004 inch.

42. An electrical connector for back plane wiring having a terminal post portion for extension through a surface; and portions extending from the post portion forming at least one open ended cylindrical crimpable surround portion generally transverse to the post portion and being internally surfaced with fluxed solder for connection to a conductor by being crimped around the conductor by pressure while being heated to flow the solder.

43. An electrical connector as in claim 42 in which the amount of fluxed solder is predetermined to cause a penetration of the solder into the conductor to a depth of typically .0007 inch.

44. An electrical connector as in claim 42 in which the fluxed solder surfacing has a thickness in the typical range .0068 to .0012 inch.

45. An electrical connector as in claim 42 in which the crimpable surround portion is typically copper of thickness in the typical range .060 inch to .004 inch and the fluxed solder surfacing has a thickness in the typical range .0068 inch to .0012 inch.

46. An electrical connector as in claim 42 in which the amount of fluxed solder is predetermined to form an alloyed monolithic continuum junction between the conductor and surround portion.

47. The method of forming an electrical connection to a conductor in the size range of about 1/0 gauge to about 40 gauge comprising:

selecting a sheet of conductive material having properties such that a portion of said sheet surrounding said conductor may be crimped around said conductor by pressure and/or heat with fluxed solder therebetween in such manner that the solder when in fluid condition is held in fixed position around said conductor by said portion;

surfacing a selected portion of said sheet with fluxed solder to an extent predetermined to form a firm junction between said conductor and said sheet relatively free of solder unalloyed with said conductor or said sheet portion without wicking along the length of the conductor when said sheet is crimped around said conductor with said fluxed solder in between and heat is applied to flow the solder long enough to form a firm electrical and mechanical junction between the conductor and said portion; and crimping the selected portion around said conductor and heating to flow the solder.

48. The method as in claim 47 in which the amount of fluxed solder surfacing is predetermined to cause a penetration of the flowed solder into the conductor and sheet to a depth of typically .0007 inch.

49. The method as in claim 47 in which the conductor is stranded and the fluxed solder surfacing has a thickness in the typical range .0068 inch to .0012 inch.

50. The method as in claim 47 in which said sheet of conductive material is typically copper of thickness in the typical range .060 to .004 inch and the fluxed solder surfacing has a thickness in the typical range .0068 to .0012 inch.

51. The method as in claim 47 including forming a terminal lug contiguous with the sheet.

52. The method as in claim 47 including forming contiguous with said sheet a collar portion spaced from said conductor protect against excessive brittleness at the point where wicking ceases.

53. The method as in claim 52 including surfacing the inner surface of the collar with a material for holding the insulation of the conductor.

54. The method of forming an electrical connection to a conductor in the size range of about 1/0 gauge to about 40 gauge comprising:

selecting a sheet of conductive material of properties such that a portion of said sheet surrounding said conductor may be crimped around said conductor by pressure and/or heat with fluxed solder therebetween in such manner that the solder when in fluid condition is held in fixed position by that portion;

surfacing a selected portion of said sheet with fluxed solder of thickness predetermined to form an alloyed monolithic continuum junction between said conductor and said sheet when said sheet is crimped around said conductor and heat is applied to flow the solder; and crimping the selected portion around said conductor and heating to flow the solder.

55. The method as in claim 54 in which the amount of fluxed solder surfacing is predetermined to cause a penetration of the flowed solder into the conductor and sheet to a depth of typically .007 inch.

56. The method as in claim 54 in which the conductor is stranded and the fluxed solder surfacing has a thickness in the typical range .0068 inch to .0012 inch.

57. The method as in claim 54 in which said sheet of conductive material is typically copper of thickness in the typical range .060 to .004 inch and the fluxed solder surfacing has a thickness in the typical range .0068 to .0012 inch.

58. The method as in claim 54 including forming a terminal lug contiguous with said surround.

59. The method as in claim 54 including forming contiguous with said sheet a collar portion spaced from said conductor to protect against excessive brittleness at the point where wicking occurs.

60. The method in claim 59 including surfacing the inner surface of the collar with a material for holding the insulation of the conductor.

References Cited

UNITED STATES PATENTS

| | | | |
|---|---|---|---|
| 1,927,382 | 9/1933 | Andrew | 174—94 |
| 2,410,321 | 10/1946 | Watts | 339—223 |
| 2,438,075 | 3/1948 | Smith | 339—275 |
| 3,065,438 | 11/1962 | Anderson | 339—16 |
| 3,123,664 | 3/1964 | Logan | 174—88 |
| 3,247,315 | 4/1966 | Miller | 174—84 |
| 3,251,022 | 5/1966 | Hammell | 339—97 |
| 3,273,102 | 9/1966 | Cobaugh | 339—18 |
| 3,322,887 | 5/1967 | Polidori | 174—94 |

FOREIGN PATENTS 1,186,579 4/1959 France.

RICHARD E. MOORE, Primary Examiner

J. H. McGLYNN, Assistant Examiner

U.S. Cl. X.R.

29—626, 628; 113—119; 174—84; 339—276